US009538721B2

(12) United States Patent
Cantwell et al.

(10) Patent No.: US 9,538,721 B2
(45) Date of Patent: Jan. 10, 2017

(54) COLLAPSIBLE ANIMAL CRATE ASSEMBLY

(71) Applicant: MID-WEST METAL PRODUCTS CO., INC., Muncie, IN (US)

(72) Inventors: Brad Cantwell, Muncie, IN (US); Stew Kerr, Muncie, IN (US); Michael E. Greene, Muncie, IN (US); Terrance L. Jones, Muncie, IN (US)

(73) Assignee: Mid-West Metal Products Co., Inc., Muncie, IN (US)

( * ) Notice: Subject to any disclaimer, the term of this patent is extended or adjusted under 35 U.S.C. 154(b) by 107 days.

(21) Appl. No.: 14/220,426

(22) Filed: Mar. 20, 2014

(65) Prior Publication Data

US 2014/0202395 A1 Jul. 24, 2014

Related U.S. Application Data

(63) Continuation of application No. PCT/US2012/056516, filed on Sep. 21, 2012.

(60) Provisional application No. 61/538,388, filed on Sep. 23, 2011.

(51) Int. Cl.
*A01K 1/03* (2006.01)
*A01K 31/06* (2006.01)
*A01K 5/00* (2006.01)
*A01K 1/00* (2006.01)
*A01K 1/02* (2006.01)

(52) U.S. Cl.
CPC .............. *A01K 1/00* (2013.01); *A01K 1/0236* (2013.01); *A01K 1/0245* (2013.01)

(58) Field of Classification Search
USPC ....... 119/474, 416, 431, 452, 453, 461, 472, 119/482, 491, 492, 497, 498, 499, 504, 119/513; D30/108, 109, 114, 116; 135/121, 143, 144, 151, 153, 154, 135/157, 96, 128; 220/6, 4.28–4.33, 220/485, 489, 491, 666, 668; 312/351.4, 312/5, 6; 248/345
See application file for complete search history.

(56) References Cited

U.S. PATENT DOCUMENTS

| 655,873 | A | * | 8/1900 | Johnson ........................ 135/121 |
| 1,375,397 | A | * | 4/1921 | Lawrence .............. A47G 19/26 |
| | | | | 135/153 |
| 1,620,143 | A | * | 3/1927 | Trimble ....................... 220/485 |
| 2,249,189 | A | * | 7/1941 | Thimm ............................. 220/6 |
| 2,892,562 | A | * | 6/1959 | Smithson ......................... 220/7 |
| 2,936,771 | A | * | 5/1960 | Marchfield et al. .......... 135/148 |

(Continued)

FOREIGN PATENT DOCUMENTS

JP 2000-125685 A 5/2000
JP 2007-037446 A 2/2007

*Primary Examiner* — Andrea Valenti
(74) *Attorney, Agent, or Firm* — Taft Stettinius & Hollister LLP; Stephen F. Rost

(57) ABSTRACT

The present invention relates to a collapsible cage assembly including an outer covering and a support frame for supporting the outer covering in an upright position. The outer covering can have a top, bottom, front, back, first side, and second side. The support frame can include a top frame body and a bottom frame body, a first side member and a second side member each being pivotably coupled to the top frame body and bottom frame body, and a top support member coupled to the top frame body. The top support member can define a V-shaped portion. The frame can also include a U-shaped member have a first end and a second end, each of the first end and second end slidably and pivotably coupled to the bottom frame body. The U-shaped member is removably coupled to the V-shaped portion of the top support member in the upright position.

12 Claims, 4 Drawing Sheets

(56) References Cited

U.S. PATENT DOCUMENTS

| | | | |
|---|---|---|---|
| 3,556,058 A * | 1/1971 | Smiler | 119/474 |
| 3,896,766 A | 7/1975 | Martin | |
| 5,549,073 A * | 8/1996 | Askins et al. | 119/474 |
| 5,626,098 A * | 5/1997 | Askins | A01K 1/032 |
| | | | 119/461 |
| 5,669,331 A * | 9/1997 | Richmond | 119/497 |
| 6,192,834 B1 * | 2/2001 | Kolozsvari | 119/498 |
| 6,345,591 B1 * | 2/2002 | Richmond | 119/497 |
| 2005/0229866 A1 * | 10/2005 | Simpson et al. | 119/499 |
| 2006/0000421 A1 * | 1/2006 | Holtz | 119/452 |
| 2008/0121188 A1 * | 5/2008 | Axelrod et al. | 119/499 |
| 2009/0165730 A1 | 7/2009 | Farmer et al. | |

* cited by examiner

COLLAPSIBLE ANIMAL CRATE ASSEMBLY

RELATED APPLICATION

This application is a continuation of International Application Serial No. PCT/US2012/56516, filed on Sep. 21, 2012, which claims the benefit of U.S. Provisional Patent Application Ser. No. 61/538,388, filed Sep. 23, 2011, both of which are hereby incorporated by reference in their entirety.

BACKGROUND

The present invention relates to an animal crate, and more particularly to an animal crate assembly useful for containing animals and which is capable of collapsing into a compact position.

Animal crates and the like are popular for pet owners to purchase for housing their domestic pet. The cage can allow the pet owner to enjoy their pet while also maintaining the pet in an enclosed and controlled environment. Cages or other similar enclosures can be made from a variety of materials such as plastic, iron, steel, wood, aluminum, woven fabric, etc. The material from which the cage is made can depend on whether the cage is primarily used indoors or outdoors. In any event, pet owners want cages to be durable so that animals enclosed within the cage cannot escape and animals outside the cage cannot enter.

Cages also can include multiple functions in addition to providing a safe enclosure for the pet. For example, the cage can provide a sanitary environment for the pet, and in some instances where more than one pet is contained within the same cage, the cage can include structure for dividing the interior thereof for separating multiple pets. Also, some cages can be easily transportable. For instance, in U.S. Publication Ser. No. 2007/0277745, a containment system is described as being collapsible for storage. Other similar cages can include a handle or other device for transporting the cage.

Unfortunately, most cages can be difficult for a layperson to assemble and setup. Some cages cannot be collapsed and thus are difficult to transport, particularly those cages that are ideal for containing large animals.

Therefore, a need exists for a collapsible animal crate assembly capable of easily being assembled and collapsed for transport.

SUMMARY

In an exemplary embodiment of the present disclosure, a collapsible cage assembly is provided. The cage assembly includes an outer covering having a top, bottom, front, back, first side, and second side. The assembly also includes a support frame for supporting the outer covering in an upright position, where the support frame includes a top frame body and a bottom frame body, a first side member and a second side member each being pivotably coupled to the top frame body and bottom frame body, and a top support member coupled to the top frame body. The top support member can include a V-shaped portion. The cage assembly also includes a U-shaped member have a first end and a second end, each of the first end and second end being slidably and pivotably coupled to the bottom frame body. The U-shaped member is removably coupled to the V-shaped portion of the top support member in the upright position.

In one aspect of this embodiment, each of the top frame body and bottom frame body is formed of a single wire. In another aspect, the first side member comprises a first side frame body, a first support member, and a second support member. Here, the first side frame body includes a pair of hooked ends pivotably coupled to the top frame body and the first support member and second support member each include a pair of hooked ends, where one of the pair of hooked ends is pivotably coupled to the bottom frame body and the other of the pair of hooked ends is pivotably coupled to the first side frame body.

In a further aspect, the second side member comprises a second side frame body, a third support member, and a fourth support member. The second side frame body can include a pair of hooked ends pivotably coupled to the top frame body and the third support member and fourth support member each include a pair of hooked ends, where one of the pair of hooked ends is pivotably coupled to the bottom frame body and the other of the pair of hooked ends is pivotably coupled to the second side frame body. Moreover, the first side frame body and second side frame body are substantially parallel to one another in the upright position. In a different aspect, the frame is removably coupled to the outer covering.

In another embodiment, a support frame is provided for supporting an animal cage assembly in an upright position. The support frame includes a top frame body and a bottom frame body, a first side member and a second side member each being pivotably coupled to the top frame body and bottom frame body, and a top support member coupled to the top frame body. The top support member can include a V-shaped portion. The support frame also includes a U-shaped member have a first end and a second end, where each of the first end and second end is slidably and pivotably coupled to the bottom frame body. The U-shaped member is removably coupled to the V-shaped portion of the top support member in the upright position.

In one form of this embodiment, each of the top frame body and bottom frame body is formed of a single wire. In another form thereof, the first side member comprises a first side frame body, a first support member, and a second support member. Here, the first side frame body includes a pair of hooked ends pivotably coupled to the top frame body and the first support member and second support member each include a pair of hooked ends. One of the pair of hooked ends is pivotably coupled to the bottom frame body and the other of the pair of hooked ends is pivotably coupled to the first side frame body.

In a further form of this embodiment, the second side member comprises a second side frame body, a third support member, and a fourth support member. The second side frame body includes a pair of hooked ends pivotably coupled to the top frame body and the third support member and fourth support member each include a pair of hooked ends, where one of the pair of hooked ends is pivotably coupled to the bottom frame body and the other of the pair of hooked ends is pivotably coupled to the second side frame body. In a different form thereof, the first side frame body and second side frame body are substantially parallel to one another in the upright position.

The frame is also configurable in both an upright position and a collapsed position. In the upright position, the U-shaped member is disposed substantially perpendicular to the top frame body and bottom frame body. In the collapsed position, the U-shaped member is disposed substantially parallel to the top frame body and bottom frame body.

In a different embodiment, a method is provided for configuring an animal enclosure between an upright position and a collapsed position. The enclosure includes an outer covering, a support frame for supporting the outer cover in the upright position, where the support frame includes a top frame body and a bottom frame body, a first side member and a second side member, a top support member coupled to the top frame body and having a V-shaped portion, and a U-shaped member have a first end and a second end. The method includes determining if the enclosure is in the upright position or the collapsed position. If the enclosure is in the upright position, the method includes disengaging the U-shaped member from the V-shaped portion of the top support member, pivoting the U-shaped member about the bottom frame body, sliding the U-shaped member along the bottom frame body, pivoting the first side member and second side member about the top frame body towards the interior of the frame, folding the first side member and second side member on top of the bottom frame body, collapsing the top frame body on top of the first side member, second side member, and bottom frame body, and configuring the animal enclosure in the collapsed position. If, however, the enclosure is determined to be in the collapsed position, the method includes lifting a handle secured to a top portion of the outer covering, sliding the U-shaped member along the bottom frame body, pivoting the U-shaped member about the bottom frame body, coupling the U-shaped member and V-shaped portion to one another, and configuring the animal enclosure in the upright position.

In one aspect of this embodiment, the method can include sliding first end and second end of the U-shaped member to approximately the midpoint of the bottom frame body. In another aspect, the method includes pivoting the U-shaped member to a position substantially parallel with the bottom frame body. In a further aspect, the method includes pivoting the U-shaped member to a position substantially perpendicular to the bottom frame body and top frame body.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
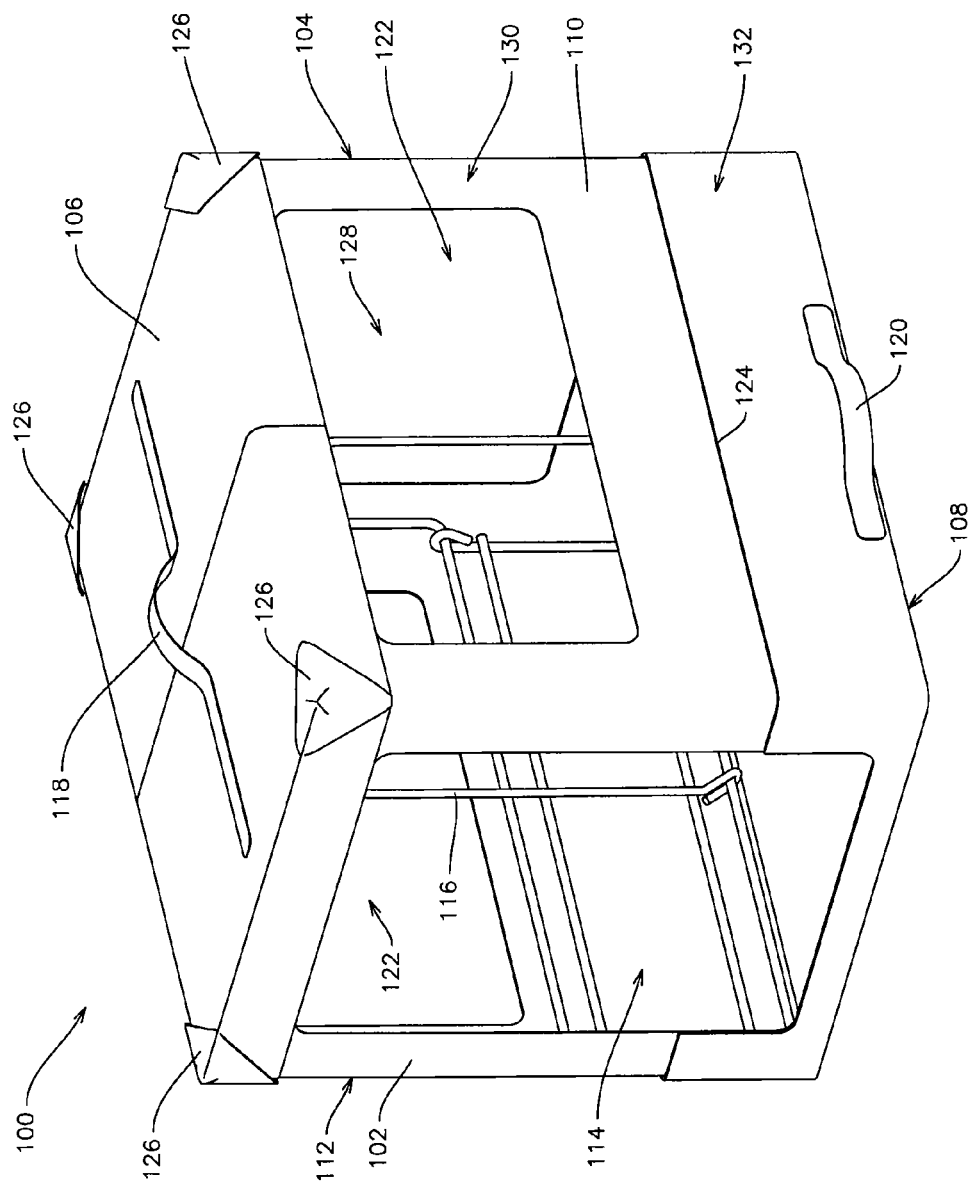
FIG. 1 is a perspective view of an animal crate assembly.

An exemplary embodiment of an animal cage assembly is shown in FIG. 1. The animal cage assembly 100 can be structured to include a front 102, a back 104, a top 106, a bottom 108, a first side 110, and a second side 112. The front 102 can define an opening 114 for access into and out of the interior of the cage 100. The opening 114 can be covered by a removable door (not shown). The door can be formed of any material. In one aspect, the door is formed of a mesh material. The door can be fastened along each side thereof. For instance, the door can be sewn or fixedly coupled to one of the four sides and selectably coupled to the other three sides. A zipper, Velcro®, or other fastener can be used to selectably couple the door to the front 102 of the cage 100. The door can also be pivotably or hingedly coupled to the front 102 as well.

The back 104 of the cage 100 also defines an opening 128 therein. A back door (not shown) similar to the front door can be incorporated into the back 104. Alternatively, a window can be formed to selectably close or cover the back opening 128. The door or window can be formed of a mesh material to permit air to flow into and out of the cage 100. The door or window may be able to open and close such that the opening 128 is not covered. The size of the door or window can be such that entry and exit from the interior of the cage may or may not be permitted, and this may also depend on the size of the animal being contained. In the event a window is defined in the back 104 of the cage, a pet owner may be able to reach inside the cage 100 to retrieve an animal, but the size of the window is such that the animal cannot escape from the cage 100. The front opening 114 and back opening 128 can have substantially the same size in one aspect. However, in a different aspect, either the front opening 114 or back opening 128 can be sized larger than the other.

The first side 110 can have a side opening 122 defined therein. The side opening 122 can be covered by a mesh window (not shown), for example, but the present disclosure is not limited to a mesh window. Other material can be used to form a window for selectably or permanently covering the side opening 122. The window can be selectably coupled to the first side 110 by a zipper, snaps, Velcro® or other known fastener. The window may be fixedly fastened to one side of the opening (e.g., top or bottom thereof). In this aspect, the window may be folded downwardly (e.g., when the window is fixedly fastened near the bottom of the opening 122) or folded onto the top 106 of the cage (e.g., when the window is fixedly fastened near the top of the opening 122).

Similar to the first side 110, the second side 112 can also define a side opening 122. The side opening 122 defined in the second side 112 can be substantially similar to the side opening 122 defined in the first side 110. For example, the side opening 122 in the second side 112 can be covered by a window formed of mesh or other material.

The animal cage assembly 100 can include an outer covering made of canvas, cloth, plastic, metal, or other material. Regardless of the type of material used, it is also desirable for the cage to be collapsible, so the outer covering is advantageously formed of a partially deformable or pliable material. The outer covering is also desirably formed of a durable material that can be cleaned without being damaged.

The outer covering can include a first portion 130 and a second portion 132. The first portion 130 and second portion 132 can be joined or coupled to one another at an interface 124. For example, in one aspect, the first portion 130 and second portion 132 can be sewn, welded, or fastened to one another. In a different aspect, the first portion 130 and second portion 132 can be selectably coupled to one another by a fastener, e.g., a zipper, Velcro®, or other means. The first portion 130 can be formed of similar material 132 as the second portion 132, although this is not a requirement of the outer covering.

The outer covering can also include handles for carrying the cage 100. In FIG. 1, for example, a top handle 118 is coupled to the top 106 of the cage 100 and a side handle 120 is coupled to the first side 110 of the cage 100. When the cage 100 is collapsed, the cage 100 may be transported by using the side handle 120, for example, and when the cage 100 is in an upright position (i.e., as shown in FIG. 1) the cage 100 can be carried by using the top handle 118. The cage may also be held in the collapsed position by fastening snaps or connectors (not shown) which are positioned about the perimeter of the cage 100.

The outer covering can further include corner supports 126 incorporated therein. The corner supports 126 can be formed of a robust fabric that adds strength to the outer covering. As shown, each corner support 126 is formed at the corner of where three different surfaces join (e.g., the front 102, top 106, and first side 110). The corner supports 126 can be joined or coupled to the outer covering via sewing or other known means. In one aspect, each corner support 126 can be formed of similar material as the second portion 132 of the outer covering. Alternatively, each corner support 126 can be formed of a different material than either the first portion 130 or second portion 132. In addition, corner supports 126 can be coupled at each corner of the top 106 of the cage 100. In a different embodiment, however, corner supports 126 can also be coupled at each corner of the bottom 108 of the cage.

The outer covering can be supported by an internal frame 116. The frame 116 can be removably coupled to the outer covering such that the outer covering can be washed with the frame 116 removed therefrom. Alternatively, the frame 116 can be coupled or fastened to the outer covering such that the frame 116 cannot be removed from the outer covering.

Figure 2:
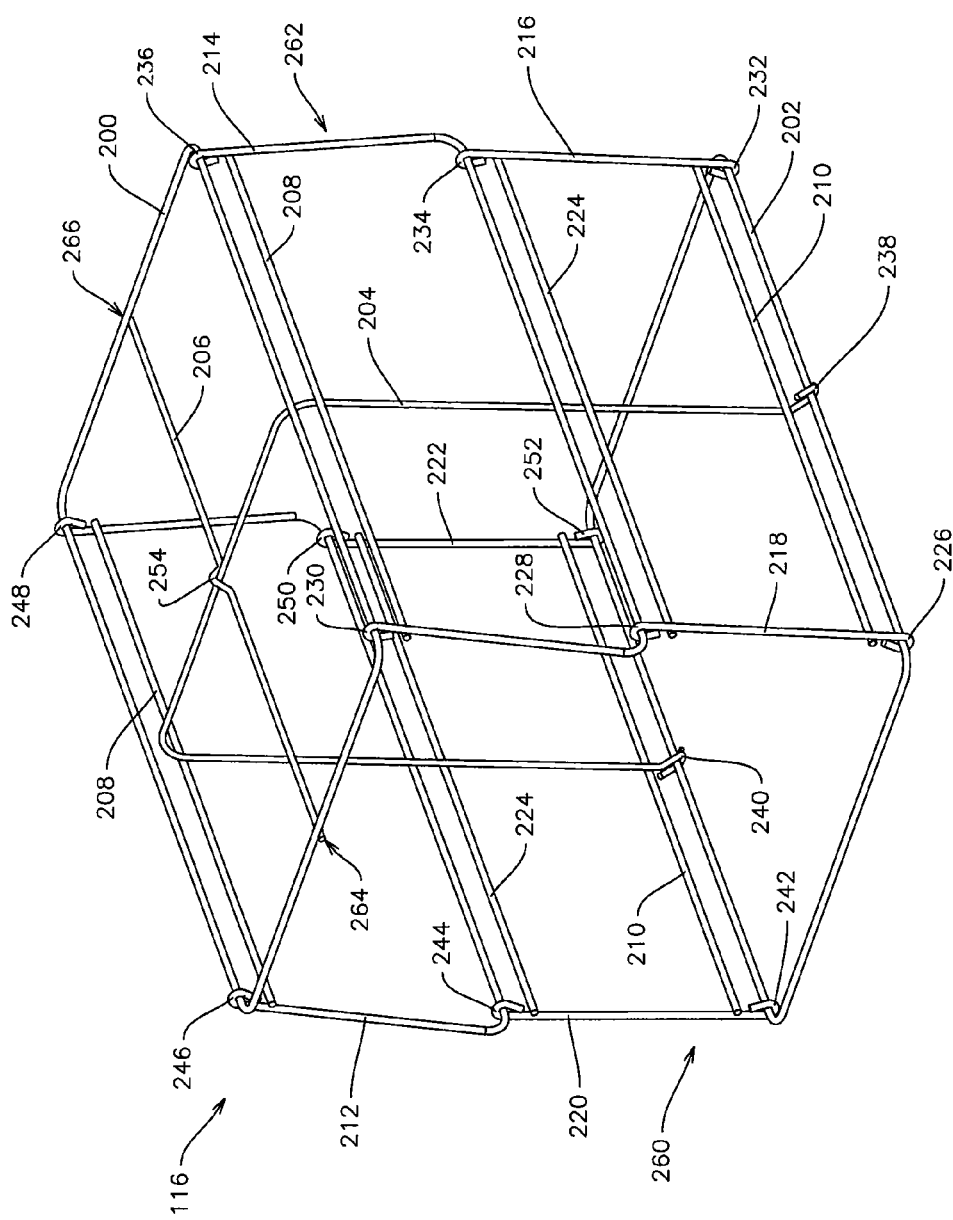
FIG. 2 is a perspective view of a frame for the animal crate assembly of FIG. 1.

Referring to FIG. 2, the frame 116 can be designed by a plurality of wire support members. For example, the frame 116 can be formed by a top frame body 200 and a bottom frame body 202. The top and bottom frame bodies can each be a single, four-sided wire that forms the top and bottom of the frame 116. The top frame body 200 can be coupled or fastened to the top 106 of the outer covering. Likewise, the bottom frame body 202 can be coupled or fastened to the bottom 108 of the outer covering.

Figure 3:
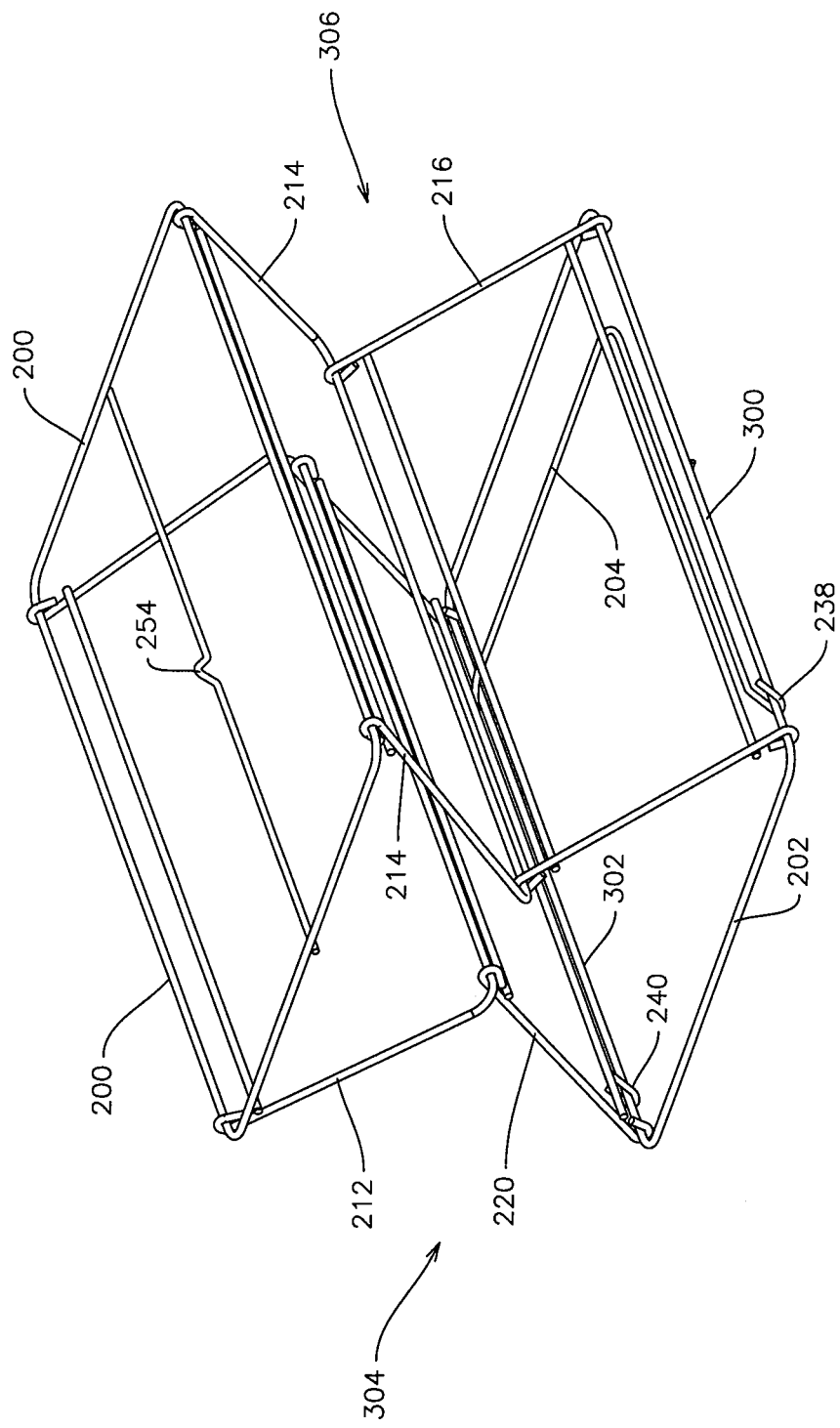
FIG. 3 is a perspective view of the frame of FIG. 2 in a partially collapsed position.
Figure 4:
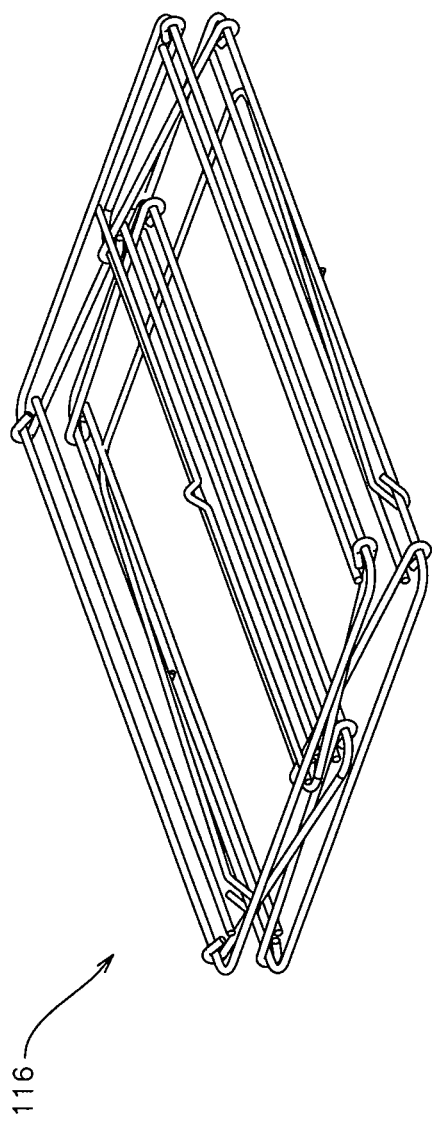
FIG. 4 is a perspective view of the frame of FIG. 2 in a collapsed position.

The frame 116 can also include a U-shaped member 204 that is slidably and pivotably coupled to the bottom frame body 202. For instance, the U-shaped member 204 can have a first hooked end 238 and a second hooked end 240 that can slide relative to the bottom frame body 202. With reference to FIG. 3, the bottom frame body 202 includes a first wire portion 300 and a second wire portion 302. The first hooked end 238 can slide and pivot relative to the first wire portion 300 and the second hooked end 240 can slide and pivot relative to the second wire portion 302. The U-shaped member 204 can be pivoted from a substantially upright portion (FIG. 2) to a collapsed position (FIG. 4) by pivoting and sliding the hooked ends relative to the bottom frame body 202. In the collapsed position, the U-shaped member 204 can be positioned substantially parallel to the top frame body 200 and bottom frame body 202.

In the upright position, the U-shaped member 204 is held or removably coupled to a longitudinally-extending top support member 206. The top support member 206 extends from the front 260 of the frame 116 to the back 262 of the frame 116 and is welded or otherwise coupled to the top frame body 200 at a first location 264 and a second location 266. The top support member 206 can include a hump or substantially V-shaped portion 254 for engaging the U-shaped member 204 in the upright position. To collapse the frame 116, the U-shaped member 204 is disengaged from the hump or substantially V-shaped portion 254 of the top support member 206 so that the U-shaped member 204 can slide and/or fold to the collapsed position.

The top body frame 200 is supported along its sides by a first side frame body 214 and a second side frame body 212. The first side frame body 214 and second side frame body 212 are formed by substantially U-shaped wires having hooked ends. For instance, the first side frame body 214 can have a pair of hooked ends 230, 236 for pivotably coupling to the top frame body 200. Likewise, the second side frame body 212 can have a pair of hooked ends 246, 248 for pivotably coupling to the top frame body 200. For further support, a side support wire 208 is welded or otherwise fixedly coupled to the first side frame body 214 and second side frame body 212 near the hooked ends. The side support wires 208 extend between the front 260 and back 262 of the frame 116.

The first side frame body 214 can be pivotably coupled to a first support member 216 and a second support member 218. The first support member 216 includes a first hooked end 232 which is pivotably coupled to the bottom frame body 202 and a second hooked end 234 which is pivotably coupled to the first side frame body 214. Similarly, the second support member 218 includes a first hooked end 226 which is pivotably coupled to the bottom frame body 202 and a second hooked end 228 which is pivotably coupled to the first side frame body 214. Support wires 210, 224 can be welded, adhered, or otherwise fixedly coupled at each end thereof to the first support member 216 and second support member 218.

The second side frame body 212 can be pivotably coupled to a third support member 220 and a fourth support member 222. The third support member 220 includes a first hooked end 242 which is pivotably coupled to the bottom frame body 202 and a second hooked end 244 which is pivotably coupled to the second side frame body 212. Similarly, the fourth support member 222 includes a first hooked end 252 which is pivotably coupled to the bottom frame body 202 and a second hooked end 250 which is pivotably coupled to the second side frame body 212. Support wires 210, 224 can be welded, adhered, or otherwise fixedly coupled at each end thereof to the third support member 220 and fourth support member 222.

Due to the pivotal relationship between the various frame support bodies and members, the frame 116 can collapse in an accordion-like manner. As shown in FIG. 3, the U-shaped member 204 is disengaged from the top support member 206 by removing or decoupling the U-shaped member 204 from the hump or V-shaped portion 254 of the top support member 206. Once disengaged, the U-shaped member 204 can slide and pivot relative to the bottom frame body 202. Hooked ends 238, 240 can slide relative to the first wire portion 300 and second wire portion 302 towards hooked ends 226, 242 (i.e., the front 304 of the frame 116). Alternatively, it may be possible to pivot and slide the U-shaped member 204 in the opposite direction such that hooked ends 238, 240 slide towards the back 306 of the frame 116.

Since the U-shaped member 204 can provide the overall support to the frame 116, once disengaged, both sides of the frame 116 are free to move towards a collapsed position. In particular, hooked end 228 of the second support member 218 and hooked end 234 of first support member 216 can be moved inward towards the interior of the frame 116 such that the first side 110 of the cage 100 begins to collapse. Likewise, hooked end 244 of the third support member 220 and hooked end 250 of the fourth support member 222 can be moved inward towards the interior of the frame 116 such that the second side 112 of the cage 100 begins to collapse.

As the frame 116 begins to fold into its collapsed position, the top frame body 200 remains substantially parallel to the bottom frame body 202. In the collapsed position, the first side 110 and second side 112 are collapsed on top of the bottom 108 of the cage. The top 106 of the cage 100 collapses on top of the already collapsed first side 110 and second side 112. The front 102 and back 104 of the cage 100 are not disengaged or folded, but rather move towards the collapsed position as the top and sides are folded into this position.

To assemble the cage 100 from its collapsed position, the top handle 118 can be lifted so that the interior of the cage is accessible. The top frame body 200 can be lifted to an upright position as the first side frame body 214 and second side frame body 212 fold into upright orientations (i.e., FIG. 2). The U-shaped member 204 can then be slidably moved and pivoted relative to the bottom frame body 202 until the U-shaped member 204 engages the hump or V-shaped portion of the top support member 206. Here, the U-shaped member 204 is disposed near the midpoint of the first wire portion 300 and second wire portion 302. Once engaged, the frame 116 can be maintained in its upright position without folding or collapsing. In its upright position, the cage 100 is then positioned as shown in FIG. 1.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A collapsible cage assembly, comprising:
    an outer covering having a top, bottom, front, back, first side, and second side; and
    a support frame for supporting the outer covering in an upright position, the support frame comprising:
        a top frame body and a bottom frame body;
        a first side member and a second side member each being pivotably coupled to the top frame body and bottom frame body, the first side member and the second side member each extending longitudinally along the bottom frame body, wherein the first side member and the second side member each comprise a side frame body and two support members, each side frame body including a pair of hooked ends pivotably coupled to the top frame body and each of the two support members includes a pair of hooked ends, where one pair of hooked ends is pivotably coupled to the bottom frame body and the other of the pair is pivotably coupled to the side frame body;
        a top support member coupled to the top frame body extending longitudinally from a front end to a back end of the support frame, the top support member including a V-shaped portion; and
        a U-shaped member including a first portion terminating at a first end and a second portion terminating at a second end, each end pivotably and directly coupled to the bottom frame body, wherein each end is slidable in a same longitudinal direction along the bottom frame body to enable the cage assembly to collapse;
    wherein, the U-shaped member is removably received in the V-shaped portion of the top support member in the upright position.

2. The cage assembly of claim 1, wherein each of the top frame body and bottom frame body is formed of a single wire.

3. The cage assembly of claim 1, wherein the first side frame body and second side frame body are substantially parallel to one another in the upright position.

4. The cage assembly of claim 1, wherein the frame is removably coupled to the outer covering.

5. The collapsible cage assembly of claim 1 wherein the U-shaped member includes a third portion connected to the first portion and to the second portion, wherein the third portion is slidable longitudinally in a direction opposite the sliding longitudinal direction of the first end and the second end to enable the cage assembly to be collapsed.

6. The collapsible cage assembly of claim 5 wherein the first portion and the second portion are substantially perpendicular to the bottom frame body when the cage assembly is in the upright position.

7. A support frame for supporting an animal cage assembly in an upright position, the support frame comprising:
    a top frame body and a bottom frame body;
    a first side member and a second side member each being pivotably coupled to the top frame body and bottom frame body, the first side member and the second side member extending longitudinally along the bottom frame body, wherein the first side member and the second side member each comprise a side frame body and two support members, each side frame body including a pair of hooked ends pivotably coupled to the top frame body and each of the two support members includes a pair of hooked ends, where one pair of hooked ends is pivotably coupled to the bottom frame body and the other of the pair is pivotably coupled to the side frame body;
    a top support member coupled to the top frame body extending longitudinally from a front end to a back end of the support frame, the top support member including a V-shaped portion; and
    a U-shaped member including a first portion terminating at a first end and a second portion terminating at a second end, each end pivotably and directly coupled to the bottom frame body, wherein each end is slidable in a same longitudinal direction along the bottom frame body to enable the cage assembly to collapse;
    wherein, the U-shaped member is removably received in the V-shaped portion of the top support member in the upright position.

8. The support frame of claim 7, wherein each of the top frame body and bottom frame body is formed of a single wire.

9. The support frame of claim 7, wherein the first side frame body and second side frame body are substantially parallel to one another in the upright position.

10. The support frame of claim 7, wherein the frame is configurable in an upright position and a collapsed position,
    where in the upright position the U-shaped member is disposed substantially perpendicular to the top frame body and bottom frame body, and
    where in the collapsed position the U-shaped member is disposed substantially parallel to the top frame body and bottom frame body.

11. The support frame of claim 7 wherein the U-shaped member includes a third portion connected to the first portion and to the second portion, wherein the third portion is slidable longitudinally in a direction opposite the sliding longitudinal direction of the first end and the second end to enable the cage assembly to be collapsed.

12. The support frame of claim 11 wherein the first portion and the second portion are substantially perpendicular to the bottom frame body when the cage assembly is in the upright position.

* * * * *